May 22, 1951 — L. HAAPALA — 2,553,855
STALK-GATHERING TUNNEL AND PICKUP GUARD
Filed March 30, 1949
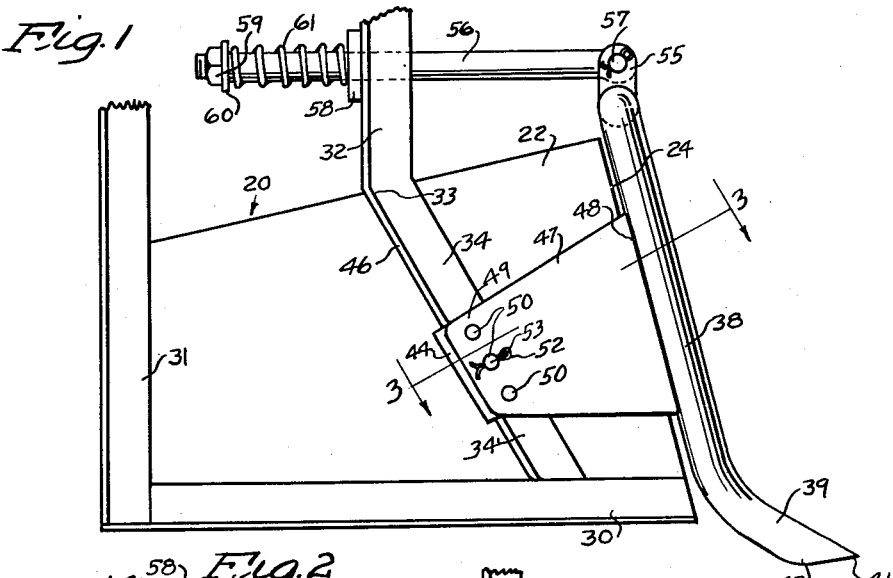
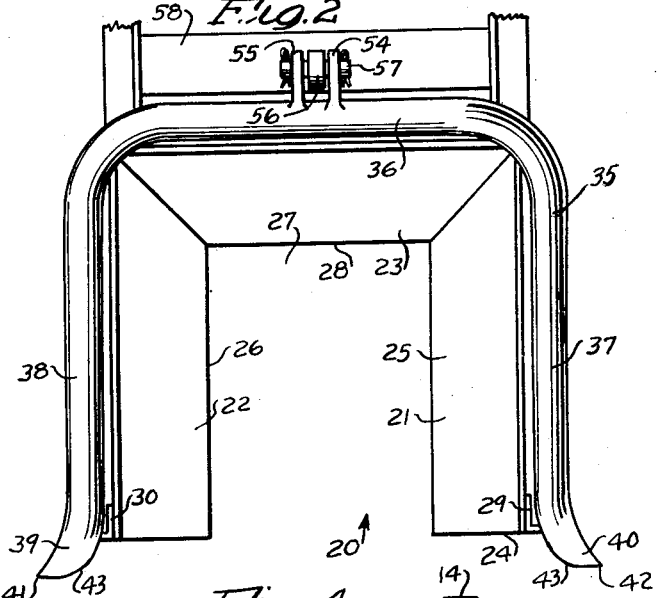
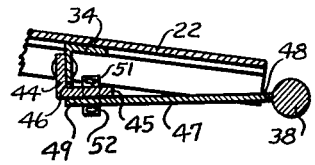
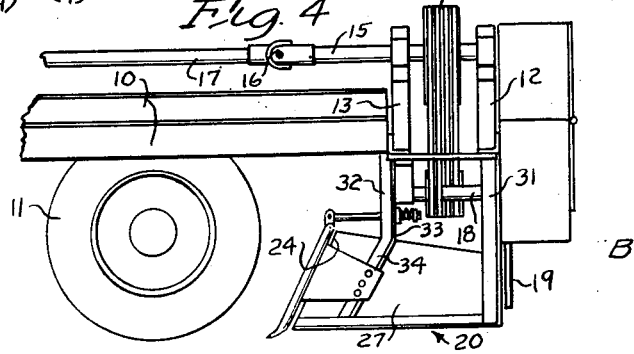
INVENTOR
LEVI HAAPALA
BY H. A. Whiteley
Attorney Patented May 22, 1951

2,553,855

UNITED STATES PATENT OFFICE 2,553,855

STALK-GATHERING TUNNEL AND PICKUP GUARD

Levi Haapala, Dassel, Minn., assignor to Whiteley and Caine, Minneapolis, Minn., a partnership Application March 30, 1949, Serial No. 84,459

5 Claims. (Cl. 56—119)

My invention relates to a stalk-gathering tunnel and pick-up guard for stalk disintegrating machines, and has for its object to provide a tunnel arrangement with a guard member at its front having substantially ground-level, projecting fingers which are adapted to come under vegetable stalks, such as cornstalks, lying in any direction from the stalk rows, and to cause the tunnel in passing over them to lift them and position them to extend longitudinally along the plant rows, where stalk disintegrating means will operate upon the so gathered cornstalks.

The European corn borer has been brought to the United States several years back and now is becoming a serious menace to the highly important corn raising industry of the United States. Its larvae feed on the green stalks of the corn and finally form nests in the pith of the stalks, where the larvae become pupae and winter over until spring or early summer, coming out in the spring as a butterfly or moth. These proceed to lay eggs upon the growing corn. The whole life span of the corn borer is thus highly destructive and may seriously diminish and deteriorate a corn crop where the corn borers are prevalent.

Most corn is harvested at the present time by means of what is known as a corn picker, which travels over the land and removes the corn from the stalks, leaving the stalks in a more or less bent and twisted condition often close to the ground. Also the stalks are laid down in many different positions at different angles to the row.

In cornstalk disintegrators, one or more tunnels are provided, which, as the machine is operated over the ground, ride over and are centered above the corn rows. Beating means are employed at the rear end of the tunnel, and it is essential to gather the cornstalks in the tunnel substantially longitudinally extended along the top of the corn rows, so the beating means will strike each cornstalk hundreds of times as it passes beneath, thus disintegrating and shredding and tearing to pieces the whole length of the cornstalks.

I have discovered that in order to successfully accomplish the gathering together of the cornstalks and laying them substantially horizontal over the corn rows and at the rear end throat of the tunnel, where the beating takes place, something more than the tunnel walls themselves is required to produce the most effective results.

To this end I have provided a powerfully supported U-bar member mounted for adjustment relative to the level of the ground with finger-like members projecting forwardly and outwardly, which have the capacity to extend under cornstalks bent toward or upon the ground no matter what their angles may be, and which will bring the cornstalks into horizontally extended position at the rear end throat of the tunnel. This construction also forms a powerful guard member about the forward open end of the tunnel, which ordinarily will be constructed of sheet metal.

It is a principal object of my invention, therefore, to mount at the front end of a stalk-gathering tunnel, which may be constructed of sheet metal, a heavy continuous U-bar preferably formed of heavy steel rod, said U-bar being formed with downwardly and outwardly projecting fingers adapted to traverse the level of the ground between cornstalk rows either at said level or in some cases actually below the level of said ground.

It is a further object of my invention to mount said U-bar on rigid members or webs extending rearwardly along the sides of the tunnel member and to secure said webs to angle iron frame members which in turn are secured by welding or in any suitable way to the sides of the tunnel members.

It is a further object of my invention to provide spaced ears at the center of the transverse portion of the U-bar, which ears are rigidly attached to said transverse member, and to connect with said ears, either directly or through an intervening link, a relief rod or bar which extends through a supporting part of the frame and maintains the U-bar and the fingers thereon in position under normal conditions but which when some heavy obstruction is contacted, as for example, a large rock, will allow the U-bar to swing on its pivotal support on the frame and pass over the obstruction.

It is a further object of my invention to have a break-pin connection between the release rod and the ears on the transverse part of the U-bar so that if the strain becomes too great, the pin will sever and completely release the guard member.

The full objects and advantages of my invention will appear in connection with the detailed description given in the following specification, and the novel features combined to produce the above noted advantageous and important results are particularly pointed out in the claims.

In the drawing, Fig. 1 is a side elevation of my invention as applied to the front end of a stalk-gathering tunnel.

Fig. 2 is a front elevation of the same taken toward the front of the stalk-gathering tunnel.

Fig. 3 is a sectional view taken on line 3—3 of Fig. 1.

Fig. 4 is a schematic view showing the entire tunnel structure in relation to the stalk disintegrating machine as a whole.

As illustrated, referring first to Fig. 4, which shows the general apparatus in which my improved invention operates, a horizontal frame 10 supported by wheels 11 has upright frame members 12 and 13 which support a central double V-pulley structure 14 driven by a shaft 15. This in turn is connected by a universal joint 16 with a shaft 17 which goes to a source of power, in practice the power take-off of the tractor which drives the device.

The pulley arrangement 14 drives two shafts, of which only one, 18, is shown. The two shafts are centered above corn rows or other vegetable rows and carry beaters 19.

A stalk-gathering tunnel indicated generally by the numeral 20 has side walls 21 and 22 and a top wall 23, which have the side elevation shape indicated in Figs. 1 and 4. The side walls 21 and 22 converge toward each other from the major front opening 24 to the side edges 25 and 26 of the minor rear opening, or throat 27, of the stalk-gathering tunnel.

Similarly the top plate 23 converges downwardly to the top edge 28 of the throat 27. Angle iron frame members 29 and 30 strengthen the bottoms of side plates 21 and 22, preferably being welded thereto, and supporting bars comprising angle irons 31 and 32 give rear and central support connected with the horizontal frame members 10.

The angle iron 31 is vertical, but the angle iron 32 is bent at 33, having the portion 34 below the bend extending at an angle toward the front of the tunnel member 20, as clearly shown in Figs. 1 and 4.

A U-member 35 has a horizontal portion 36 and two leg portions 37 and 38, as very clearly shown in Fig. 2. This U member 35 will preferably be formed of a relatively heavy round iron rod which is solid, as indicated in Fig. 3, and which is suitably bent into the shape shown in Fig. 2.

The leg 38 has a finger-like member 39 which extends outwardly and downwardly at its end, as shown con-jointly by Figs. 1 and 2.

The leg 37 has a similar finger-like member 40, similarly arranged. Each of members 39 and 40 comes to a substantial point at 41 and 42, and the lower body part of the ends of members 38 and 39 is carried down in a reinforcing bulge 43, which has its lower surfaces slightly below the points 41 and 42, and substantially at ground level.

As shown in Fig. 3, the portion 34 of angle bar 32, which contacts and is firmly welded to side wall 22, has secured to its outwardly extending web 46, preferably by bolting or riveting, a short piece of angle iron 44 with its forwardly extending web 45 overlies the outwardly extending web 46 of part 34.

A rigid member or web 47, preferably of quite large area and of rhomboidal shape, as shown in Fig. 1, is welded at 48 to the leg 38 of the U member 35.

A similar rigid member or web piece, not shown, is welded in the same way to the leg 37 and the side member 21.

The web 47, as clearly shown, has diverging edges, which give it welded contact with the leg 38 (also the leg 37) of quite considerable extent.

The smaller end 49 of web 47 overlies the flange 45 of angle iron member 44 and is provided with a multiplicity of holes 50, the center one which are continued through angle iron portion 45, it being understood, of course, that a similar arrangement is provided for the leg 37.

The smaller ends 49 of webs 47 extending from each of legs 38 and 37 overlies the flange 45 of angle iron member 44. A hole 50 is positioned to match the hole 51 in the flange 45 of angle iron 44. A strong bolt 52, preferably held in position by cotterpins, as shown at 53, Fig. 1, secured the U-pieces through the webs 48 and 47 in a pivotal manner to the portion 34 of frame pieces 32. This pivotal connection is held set in the following manner.

To the horizontal part 36 of the U-piece are secured a pair of ears 54 and 55, as shown, by welding. A rectangular bar 56 extends between the ears and is united to or held by them with a break-bolt or shear pin 57.

The bar 56, as best shown in Fig. 2, extends through an opening in transverse frame bar 58 which is supported upon the upper portion of angle iron supports 32. A rear portion 59 of the bar 56 extends past the frame bar 58 and has at its end a nut 59 and a washer 60. Between the washer 60 and the frame plate 58 is a strong compression spring 61.

It follows that when the fingers 39 and 40 on the ends of side rails 38 or either of them strike an obstruction in or projected from the surface of the ground, which it cannot remove, the entire structure may rock on the bolts 52 and the compression spring 61 will take up the rocking and also the work of the machine to continue without injury to the frame members 39 and 40. If, however, the obstruction is too strong, the shear-pin 57 will fracture allowing the entire U-piece construction to swing clockwise over the obstruction.

I claim:

1. In a machine of the class described, in combination, a mobile frame, a stalk-gathering tunnel formed of top and side walls which diverge from an enlarged front opening to a restricted rear throat, a pair of spaced depending supporting bars carried by the mobile frame and secured to the side walls of the tunnel in rear of the front opening and forming a support for the tunnel, a U-shaped guard having arms which extend substantially parallel with the front edges of the side walls of the tunnel, the outer ends of each of said arms formed in angularly outwardly extending pick-up fingers which are in a plane parallel with the lower edges of the side walls of the tunnel, and an adjustable connection between each of said supporting bars and the arms of the U-shaped member for adjusting the position of said U-shaped member relative to the front opening of the tunnel.

2. In a machine of the class described, in combination, a mobile frame, a stalk-gathering tunnel formed of top and side walls which diverge from an enlarged front opening to a restricted rear throat, a pair of spaced depending supporting bars carried by the mobile frame and secured to the side walls of the tunnel in rear of the front opening and forming a support for the tunnel, a U-shaped guard having arms which extend substantially parallel with the front edges of the side walls of the tunnel, the outer ends of each of said arms formed in angularly outwardly extending pick-up fingers which are in a plane parallel with the lower edges of the side walls of the tunnel, a rigid member secured to each arm of the U-shaped member and extending rearwardly to one of the supporting bars, a pivotal connection between each of said members and one of the supporting bars being effective to permit rotation of the U-shaped member relative to the supporting bars when a pick-up finger engages an obstruction, and resilient means cooperable with a portion of said U-shaped member for resisting rotative movement.

3. In a machine of the class described, in combination, a mobile frame, a stalk-gathering tunnel formed of top and side walls which diverge from an enlarged front opening to a restricted rear throat, a pair of spaced depending supporting bars carried by the mobile frame and secured to the side walls of the tunnel in rear of the front opening and forming a support for the tunnel, a U-shaped guard having arms which extend substantially parallel with the front edges of the side walls of the tunnel, the outer ends of each of said arms formed in angularly outwardly extending pick-up fingers which are in a plane parallel with the lower edges of the side walls of the tunnel, a rigid member secured to each arm of the U-shaped member and extending rearwardly to one of the supporting bars, a pivotal connection between each of said rigid members and said bars, a relief rod secured to said U-shaped member and extending rearwardly between said supporting bars, a cross member surrounding said relief rod and joined at its outer ends to said supporting bars, and resilient means cooperable between said cross member and said relief rod for restricting rotative movement of the U-shaped member.

4. In a machine of the class described, in combination, a mobile frame, a stalk-gathering tunnel formed of top and side walls which diverge from an enlarged front opening to a restricted rear throat, a pair of spaced depending supporting bars carried by the mobile frame and secured to the side walls of the tunnel in rear of the front opening and forming a support for the tunnel, a U-shaped guard having arms which extend substantially parallel with the front edges of the side walls of the tunnel, the outer ends of each of said arms formed in angularly outwardly extending pick-up fingers which are in a plane parallel with the lower edges of the side walls of the tunnel, means for pivotally connecting each arm of the U-shaped member to one of the supporting bars, a cross member extending between said bars and overlying the top of the tunnel, a pair of ears secured to the upper portion of the U-shaped member, a relief rod penetrating said cross member and extending between said ears, resilient means cooperable between said relief rod and said cross member for resisting pivotal movement of the U-shaped member, and a shear pin forming a frangible connection between said relief rod and said ears which is operable to permit the U-shaped member to rotate freely when one of the fingers engages a stationary obstruction.

5. In a machine of the class described, in combination, a mobile frame, a stalk gathering tunnel formed of top and side walls which diverge from an enlarged front opening to a restricted rear throat, a pair of spaced depending supporting bars carried by the mobile frame and secured to the side walls of the tunnel in rear of the front opening and forming a support for the tunnel, a U-shaped guard having arms which extend substantially parallel with the front edges of the side walls of the tunnel, the outer ends of each of said arms formed in angularly outwardly extending pick-up fingers which are in a plane parallel with the lower edges of the side walls of the tunnel, a rigid member secured to each arm of the U-shaped member and extending rearwardly to one of the supporting bars, means forming an adjustable connection between each of said rigid members and the supporting bars for adjusting the position of said U-shaped member relative to the front opening of the tunnel, said last named means permitting pivotal rotation of the U-shaped member when either of the outer pick-up fingers engages an obstruction, and resilient means cooperable with a portion of the U-shaped member for resisting rotative movement of said member.

LEVI HAAPALA.

REFERENCES CITED

The following references are of record in the file of this patent:

UNITED STATES PATENTS

| Number | Name | Date |
| --- | --- | --- |
| 657,411 | Hamm | Sept. 4, 1900 |
| 1,945,733 | Court | Feb. 6, 1934 |
| 2,023,491 | Rust et al. | Dec. 10, 1935 |
| 2,479,510 | Pollard et al. | Aug. 16, 1949 |